United States Patent [19]

Suh

[11] Patent Number: 5,011,866

[45] Date of Patent: Apr. 30, 1991

[54] INSULATING ALKENYL AROMATIC POLYMER FOAM

[75] Inventor: Kyung W. Suh, Granville, Ohio

[73] Assignee: The Dow Chemical Company, Midland, Mich.

[21] Appl. No.: 433,644

[22] Filed: Nov. 8, 1989

[51] Int. Cl.$^5$ .................................................. C08J 9/08
[52] U.S. Cl. .................................. 521/97; 428/314.8;
428/398; 521/79; 521/81; 521/98; 521/146
[58] Field of Search ................. 521/97, 98, 79, 81, 521/146; 428/314.8, 398

[56] References Cited

U.S. PATENT DOCUMENTS

| | | | |
|---|---|---|---|
| 4,387,169 | 6/1983 | Zabrocki et al. | 521/79 |
| 4,931,484 | 6/1990 | Hovis | 521/79 |

*Primary Examiner*—Morton Foelak

[57] ABSTRACT

Alkenyl aromatic thermoplastic synthetic resinous elongate foam bodies having a machine direction, a traverse direction and closed noninterconnecting gas-containing cells are prepared using at least 70 percent by weight of 1,1,1-trifluoroethane and or 1,1,1,2-tetrafluoroethane as a blowing agent or part of a blowing agent mixture. These foam bodies have an average cell size of 0.01 to 0.3 millimeters, a density of from about 0.75 to about 6.0 pounds per cubic foot, an absolute dimensional stability of less than 4 percent in any direction when measured by the test designated ASTM D2126/C578, and preferably a minimum cross-sectional dimension of at least 0.25 inch, a cross-sectional area of at least 8 square inches, a water vapor permeability not greater than 1.8 per inch.

A cell size enlarger agent may be necessary for cell sizes in the 0.2–0.3 range.

10 Claims, No Drawings

INSULATING ALKENYL AROMATIC POLYMER FOAM

BACKGROUND OF THE INVENTION

This invention relates to a dimensionally stable insulating alkenyl aromatic polymer foam extruded in large cross sections employing specific blowing agents or specific blowing agent mixtures.

One major application for alkenyl aromatic polymer foam, such as styrene polymer foams, is in the field of thermal insulation. Desirably a styrene polymer foam for thermal insulation has an average cell size of less than about 0.3 millimeters and excellent dimensional stability.

One manner in which the thermal insulation value of styrene polymer foams is increased is by the addition of certain fully-halogenated compounds, such as dichlorodifluoromethane, into the styrene polymer foam as a blowing/insulating agent. Such a compound, when contained in the cells of the extruded styrene polymer foam, increases the thermal insulation value.

Another major consideration for extruded styrene polymer foam is dimensional stability. Dimensional stability is particularly important when the extruded styrene polymer foam is employed in construction uses or is laminated to a cementitious layer. For most commercial applications regular rectangular forms are required and while a distorted shape can be cut into a rectangular form, considerable product is lost in cutting and must be discarded as scrap. Another consideration is that if an extruded styrene polymer foam product is not dimensionally stable, then the foamed polystyrene must be maintained in storage for a sufficient length of time until substantially all dimensional instability, such a shrinking, swelling, warping or bulging has stopped.

Still another important consideration is the choice of a blowing/insulating agent. Certain of these agents, particularly fully-halogenated compounds such as dichlorodifluoromethane, when released to the atmosphere upon extrusion of the styrene polymer foam or upon aging of the foam are believed to cause harm to the atmosphere. Thus, it is desirable to reduce or eliminate these fully-halogenated compounds.

Some of these considerations concerning extruded foams and their manufacture are discussed at great length in U.S. Pat. Nos. 2,409,910; 2,515,250; 2,669,751; 2,848,428; 2,928,130; 3,121,130; 3,121,911; 3,770,688; 3,815,674; and 3,960,792, the teachings of which are herein incorporated with reference thereto.

Canadian Patent No. 1,086,450, hereby incorporated by reference, refers to this problem and proposes a variety of low permeability, insulating/blowing agents, or mixtures of those agents, having a permeability through an alkenyl aromatic resinous polymer of not greater than 0.017 times the permeability of nitrogen through the body, a thermal conductivity of less than about 0.10 British Thermal Units-inch per hour per square foot per degree Fahrenheit and having the following formula:

$$R1\text{-}CF_2\text{-}R2$$

herein R1 is a methyl, ethyl, chloromethyl, dichloromethyl, difluoromethyl, chlorofluoromethyl, fluoromethyl, or trifluoromethyl radical and R2 is hydrogen or a chloro, fluoro, methyl or trifluoromethyl radical with the further characterization that the compound contain no more than 3 carbon atoms and if the compound contains as halogen only 2 fluorine atoms, the compound must have 3 carbons.

1,1,1-trifluoroethane (HFC-143a) is specifically listed in the Canadian patent as being one of a number of low-permeability blowing agents useful in the practice of that invention and 1,1,1,2-tetrafluoroethane (HFC-134a) is contemplated as being within the scope of the formula defining low-permeability blowing agents. Also chlorodifluoromethane (HCFC-22) is listed as a secondary or high-permeability blowing agent useful in the preparation of the foam of the Canadian patent.

However, in Table I of the Canadian patent, it can be seen that polystyrene foam prepared from certain of the low-permeability blowing agents, particularly 1,1-difluoro-1-chloroethane (HCFC-142b), have a dimensional stability which is excessive, although the cell size is 0.20 mm (millimeters) This is particularly noted in Example 16. Examples 14 and 15 of the same Table I appear to solve the dimensional stability problem by using 50/50 and 40/60 (weight of each component by total blowing agent weight) blowing agent mixtures of 1,1-difluoroethane (HFC-152a) and HCFC-142b while retaining a cell sizes of 0.12 mm and 0.14 mm respectively.

U.S. Pat. No. 3,960,792, previously incorporated by reference, teaches how to prepare a dimensionally stable expanded closed cell polystyrene foam body while employing as the fluid foaming agent a volatile material which has a diffusion rate through the polystyrene resin about 0.75 to 6 times the diffusion rate of air through polystyrene resin with the foaming agent being a mixture of at least two compounds having carbon chemically combined therein.

U.S. Pat. No. 4,636,527, hereby incorporated by reference, teaches how to prepare an expanded closed cell polystyrene foam body while employing as the fluid foaming agent a mixture of carbon dioxide and ethyl chloride. Optionally dichlorodifluoromethane, 1,1-difluoro-1-chloroethane and mixtures thereof may also be included as part of the blowing agent mixture.

There is a need to be able to produce a dimensionally stable extruded polystyrene foam body with a non-fully halogenated insulating/blowing agent.

More particularly there is a need to be able to produce a dimensionally stable extruded polystyrene foam body with 1,1,1,2-tetrafluoroethane or 1,1,1-trifluoroethane as the only or major insulating/blowing agent.

SUMMARY OF THE INVENTION

The present invention is an alkenyl aromatic thermoplastic synthetic resinous elongate foam body having a machine direction and a transverse direction with the body having a plurality of closed noninterconnecting gas-containing cells.

The cells have an average cell size of from about 0.01 to about 0.3 millimeters when measured across a minimum cross-sectional dimension of the body, with the body being of a generally uniform cellular structure without substantial discontinuities.

The foam body has a density of from about 0.75 to about 6.0 pounds per cubic foot (12 to 96 kilograms/cubic meter).

Preferably the foam body has a cross-sectional area of at least 8 square inches (51.6 square centimeters) with a minimum cross-sectional dimension of at least about 0.25 inch (6.35 millimeters), a water vapor permeability not greater than about 1.8 perm inch (3.02 metric perm centimeters), in addition to a density of from about 0.75 to about 6.0 pounds per cubic foot (12 to 96 kilograms/cubic meter).

Further limitations are that the cells contain, as gas, at least 70 percent by weight 1,1,1,2-tetrafluoroethane or 1,1,1-trifluoroethane and that any change in dimension in any direction be about four percent (absolute, meaning a positive or negative value) or less when measured by the test designated ASTM D2126/C578.

Surprisingly the use of 1,1,1,2-tetrafluoroethane or 1,1,1-trifluoroethane has been found to decrease cell size while still being able to maintain dimensional stability.

DETAILED DISCUSSION OF ILLUSTRATIVE EMBODIMENTS

The volatile fluid foaming agents used to prepare the foams of the present invention are those having at least 70 percent by weight 1,1,1,2-tetrafluoroethane or 1,1,1-trifluoroethane based on total blowing agent mixture weight. More preferably the blowing agent is at least 80 percent HFC-134a or HFC-143a. Most preferably the blowing agent is 100 percent HFC-134a or HFC-143a. Any remaining part of the blowing agent mixture can be any other chemical or physical blowing agent. Preferably the remaining part of the blowing agent mixture is water ($H_2O$), 1 to 4 carbon aliphatic hydrocarbons, such as ethane, chlorodifluoromethane (HCFC-22), or carbon dioxide ($CO_2$). Other combinations include a chemical blowing agent mix of sodium bicarbonate and boric acid (or citric acid) and mixtures of the above, including specifically $CO_2$ and $H_2O$, 1 to 4 carbon aliphatic hydrocarbons and $CO_2$ and a chemical blowing agent mix of sodium bicarbonate and boric acid (or citric acid) and $CO_2$.

Preferably the blowing agents and their mixtures (weight percent based on total blowing agent mixture weight) are as follows:
1. 100% HFC-134a;
2. 100% HFC-143a;
3. 94–100% HFC-134a/0–6% CO2;
4. 94–100% HFC-143a/0–6% CO2;
5. 70–100% HFC-134a/0–30 HCFC-22, preferably 80–100% HFC-134a/0–20 HCFC-22;
6. 70–100% HFC-143a/0–30 HCFC-22, preferably 80–100% HFC-134a/0–30 ethane;
7. 70–100% HFC-134a/0–30 ethane; and
8. 70–10% HFC-143a/0–30 ethane.

The amount of blowing agent or blowing agent mixture added to the alkenyl aromatic synthetic resin to produce a foam is about 3 to about 18 weight parts per hundred parts of resin by weight.

The term 'alkenyl aromatic synthetic resin' refers to a solid polymer of one or more polymerizable alkenyl aromatic compounds. The polymer or copolymer comprises in chemically combined form, at least 60 percent by weight of at least one alkenyl aromatic compound having the general formula

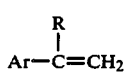

wherein Ar represents an aromatic hydrocarbon radical, or an aromatic halo-hydrocarbon radical of the benzene series, and R is hydrogen or the methyl radical. Examples of such alkenyl aromatic resins are the solid homopolymers of styrene, alpha-methylstyrene, o-methylstyrene, m-methylstyrene, p-methylstyrene, ar-ethylstyrene, ar-vinylstyrene, ar-chlorostyrene or ar-bromostyrene: and the solid copolymers of two or more of such alkenyl aromatic compounds with minor amounts of other readily polymerizable olefinic compounds such as, for example, methylmethacrylate, acrylonitrile, maleic anhydride, citraconic anhydride, itaconic anhydride, acrylic acid, and rubber reinforced (either natural or synthetic) styrene polymers.

The preparation of alkenyl aromatic resinous polymer foams in accordance with the present invention is most conveniently done in a known manner wherein the alkenyl aromatic synthetic resin is heat-plastified within an extruder. From the extruder the heat plastified resin is passed into a mixer, for example a rotary mixer wherein a studded rotor is enclosed within a housing which has a studded internal surface which intermeshes with the studs on the rotor. The heat-plastified resin and a volatile fluid foaming agent are fed into the inlet end of the mixer and discharged from the outlet end, the flow being in a generally axial direction From the mixer, the gel passes through coolers and from the coolers to a die which extrudes a generally rectangular board.

Other methods of preparing alkenyl aromatic resinous polymer foams are known and include systems which the foam is extruded and foamed under subatmospheric, atmospheric and super-atmospheric conditions. One such sub-atmospheric (vacuum) extrusion method useful in preparing the foams of the present invention is detailed in U.S. Pat. No. 3,704,083. This type of vacuum system does not require a low-permeability/high-permeability blowing agent mixture, due to the influence of the vacuum on the foaming process.

In the preparation of foams generally, it is often desirable to add a nucleating agent such as, for example talc, calcium silicate, or indigo to reduce the cell size.

However in the preparation of the foams in accordance with the present invention, little or no nucleating agent should be required when using HFC-134a or HFC-143a due to the unexpected nucleating action of these blowing agents. In fact, the exact opposite may be required to achieve specific desired cell sizes, an additive or agent which increases cell size may be required, for example, polyethylene or other waxy materials known in the art.

So depending on the cell size desired In the preparation of foams in accordance with the present invention, it may be desirable to add no or only a small amount of nucleating agent such as, for example talc, calcium silicate, or indigo to regulate the cell size or it may be desirable to add an additive which increases cell size.

Other type of ingredients which may be included are fire retardants, for example hexabromocyclododecane or monochloropentabromocyclohexane, extrusion aids, for example barium stearate or calcium stearate, and acid scavengers, for example magnesium oxide or tetrasodium pyrophosphate may also be added.

EXAMPLES

The following examples in Tables 1 are prepared from polystyrene having a weight average molecular weight of about 200,000, calcium stearate (in amounts ranging from about 0.00 to about 0.08 weight parts per hundred based on resin weight, but generally about 0.05) and the blowing agents identified in Table 1.

These ingredients are added to an extruder and melted at a temperature of about 220° C and a pressure of about 2000 psi (pounds per square inch).

This mixture of heat-plastified ingredients and the volatile blowing agent mixture (having at least about 70 weight percent by total blowing agent weight HFC-134a or HFC-143a) is then introduced into the inlet end of the mixer where the mixture is thoroughly mixed.

Generally for forming a foam board, the mixture is then cooled to a foaming temperature, extruded through a slit die and expanded between a pair of substantially parallel plates to form a foam board having a rectangular cross-section of at least 8 square inches (51.6 square centimeters) with a minimum cross-sectional dimension of at least about 0.25 inch (6.35 millimeters).

For the purposes of Table 1, the mixture is then cooled to a foaming temperature, extruded through a slit die and expanded to a round shape (continuous cylindrical shape) having a diameter of about ½ inch to about ¾ inch.

For the dimensional stability testing the specimens in Tables 1 are prepared according to ASTM D-2126/C578. After conditioning the dimension of the extrusion axis of the specimens is taken to the nearest ±0.1%. Cell sizes may be measured by any known method, such as for example those methods detailed by ASTM.

The specimens are then exposed to a temperature of 70°±2° C. (158°±4° F.) and a relative humidity of 97±3% for a period of 7 days. After cooling at room temperature for 2 hours the dimensions of the three principal axes (vertical, horizontal and extrusion) of the specimens are again taken to the nearest ±0.1%. The percentage dimensional change in the extrusion axis, positive or negative, is then determined to the nearest 0.1%.

TABLE 1

Cell size and Dimensional Stability Examples with HFC-134a and HFC-143a and Comparative Examples with CFC-12

| Blowing Agent Type and Amount (pph)[1] and Ratio[3] | Foaming Temperature °C.[1] | Density pcf[1] | Cell Size mm[1,4] | Dimensional Stability %[2] |
|---|---|---|---|---|
| (12.3) CFC-12* | 122 | 2.79 | 0.148 | 3.06 |
| (12.3) CFC-12* | 124 | 2.46 | 0.144 | 1.14 |
| (13.1) CFC-12* | 127 | 2.21 | 0.224 | 2.74 |
| (12.0) CFC-12* | 118 | 3.56 | 0.600 | 5.62 |
| (9.6) HFC-134a | 133 | 2.55 | 0.1 | −0.30 |
| (9.6) HFC-134a | 133 | 2.71 | 0.1 | −0.65 |
| (9.9) HFC-134a | 118 | 2.81 | 0.1 | −1.29 |
| (8.7)[1] HFC-134a and HCFC-22 (83.3/16.7)[3] | 124 | 3.23 | 0.112 | −0.63 |
| (8.5) HFC-134a and HCFC-22 (83.3/16.7) | 122 | 3.62 | 0.1 | 0.80 |
| (10.4) HFC-134a and HCFC-22 (83.3/16.7) | 124 | 2.12 | 0.130 | −0.66 |
| (10.0) HFC-134a and HCFC-22 (83.3/16.7) | 118 | 5.57 | 0.1 | 0.61 |
| (10.1) HFC-134a and CO₂ (90.9/9.1) | 118 | 3.99 | 0.138 | 0.56 |
| (10.1) HFC-134a and CO₂ (90.9/9.1) | 117 | 2.50 | 0.197 | 0.61 |
| (10.1) HFC-134a and CO₂ (90.9/9.1) | 117 | 2.53 | 0.230 | 1.36 |
| (8.6) HFC-134a and ETHANE (83.3/16.7) | 125 | 2.40 | 0.1 | −0.44 |
| (8.4) HFC-134a and ETHANE (83.3/16.7) | 125 | 2.46 | 0.1 | −0.19 |
| (9.0) HFC-134a and ETHANE (83.3/16.7) | 118 | 3.23 | 0.1 | −1.87 |
| (8.6) HFC-143a | 120 | 3.24 | 0.151 | −1.29 |
| (8.6) HFC-143a | 121 | 2.80 | 0.131 | −1.29 |
| (8.9) HFC-143a and HCFC-22 (83.3/16.7) | 117 | 4.14 | 0.1 | 0.61 |
| (8.9) HFC-143a and HCFC-22 (83.3/16.7) | 116 | 3.89 | 0.1 | 0.61 |
| (8.7) HFC-143a and HCFC-22 (83.3/16.7) | 121 | 2.50 | 0.176 | 0.61 |

*Not examples of the present invention.
[1] pph = weight parts per hundred weight parts of resin; °C. = degrees centigrade; pcf = pounds per cubic foot; mm = millimeters;
[2] As measured by ASTM D2126/C578 in the extrusion direction
[3] Weight percent ratio based on total blowing agent weight
[4] Cell sizes were not measured below 0.1 due to test limitations As can be seen in the in Table 1, not only is it possible to obtain small cell sizes with HFC-134a or HFC-143a and certain mixtures having at least 70 weight percent of these blowing agents, it is also possible to obtain dimensional stability, even when using HFC-134a or HFC-143a alone as a blowing agent.

This unexpected and valued combination of small cell size (less than about 0.30 mm) and dimensional stability is clearly shown in Table 1 for HFC-134a or HFC-143a.

Foams of the present invention, using HFC-134a or HFC-143a or specified mixtures having at least 70 weight percent of HFC-134a or HFC-143a based on total blowing agent mixture weight, will have a fine cell structure of less than about 0.3 mm, preferably less than about 0.25 mm and most preferably less than about 0.1 mm and a dimensional stability in any direction about four percent or less when measured by the test designated ASTM D2126/C578. The foam will also have a five year k-factor of at least 0.03 British Thermal Units-inch/hour-square foot-degree Fahrenheit lower than that of a foam with only air in the cells.

As is apparent from this specification, the present invention is susceptible of being embodied with various alterations and modifications which may differ in some respect from those examples described in this specification and description. For this reason it is to be fully understood that this specification and description is intended to be merely illustrative and is not to be construed or interpreted as being restrictive or otherwise limiting of the present invention.

What is claimed is:

1. An alkenyl aromatic thermoplastic synthetic resinous elongate foam body comprising the body having a machine direction and a transverse direction and defining a plurality of closed noninterconnecting gas-containing cells therein, the cells having an average cell size of from about 0.01 to about 0.3 millimeters when measured across a minimum cross-sectional dimension of the body, the body being of a generally uniform cellular structure without substantial discontinuities, the body having a cross-sectional area of at least 8 square inches (51.6 square centimeters) with a minimum cross-sectional dimension of at least about 0.25 inch (6.35 millimeters), a water vapor permeability not greater than about 1.8 perm inch (3.02 metric perm centimeters) a density of from about 1.0 to about 6.0 pounds per cubic foot (16 to 96 kilograms/cubic meter) with the further limitations that the cells contain, as gas, at least 70 percent by weight of a compound selected from the group consisting of 1,1,1-trifluoroethane and 1,1,1,2-tetrafluoroethane and that any change in dimension in any direction be about four percent or less when measured by the test designated ASTM D2126/C578.

2. An alkenyl aromatic thermoplastic synthetic resinous elongate foam body, as recited in claim 1, wherein any remaining blowing agent is selected from the group consisting of ethane, chlorodifluoromethane and carbon dioxide.

3. An alkenyl aromatic thermoplastic synthetic resinous elongate foam body, as recited in claim 2, wherein the alkenyl aromatic thermoplastic synthetic resin is polystyrene.

4. An alkenyl aromatic thermoplastic synthetic resinous elongate foam body comprising the body having a machine direction and a transverse direction and defining a plurality of closed noninterconnecting gas-containing cells therein, the cells having an average cell size of from about 0.01 to about 0.3 millimeters when measured across a minimum cross-sectional dimension of the body, the body being of a generally uniform cellular structure without substantial discontinuities, the body having a density of from about 1.0 to about 6.0 pounds per cubic foot (16 to 96 kilograms/cubic meter) with the further limitations that the cells contain, as gas, at least 70 percent by weight of a compound selected from the group consisting of 1,1,1-trifluoroethane and 1,1,2-tetrafluoroethane and that any change in dimension in any direction be about four percent or less when measured by the test designated ASTM D2126/C578.

5. An alkenyl aromatic thermoplastic synthetic resinous elongate foam body, as recited in claim 4, wherein any remaining blowing agent is selected from the group consisting of ethane, chlorodifluoromethane and carbon dioxide.

6. An alkenyl aromatic thermoplastic synthetic resinous elongate foam body, as recited in claim 5, wherein the alkenyl aromatic thermoplastic synthetic resin is polystyrene.

7. An alkenyl aromatic thermoplastic synthetic resinous elongate foam body consisting essentially of an alkenyl aromatic thermoplastic synthetic resin, a blowing agent and a cell size enlarging agent with the body having a machine direction and a transverse direction and defining a plurality of closed noninterconnecting gas-containing cells therein, the cells having an average cell size of from about 0.01 to about 0.3 millimeters when measured across a minimum cross-sectional dimension of the body, the body being of a generally uniform cellular structure without substantial discontinuities, the body having a density of from about 1.0 to about 6.0 pounds per cubic foot (16 to 96 kilograms/cubic meter) with the further limitations that the cells contain, as gas, at least 70 percent by weight of a compound selected from the group consisting of 1,1,1-trifluoroethane and 1,1,1,2-tetrafluoroethane and that any change in dimension in any direction be about four percent or less when measured by the test designated ASTM D2126/C578.

8. An alkenyl aromatic thermoplastic synthetic resinous elongate foam body, as recited in claim 7, wherein the average cell size is from about 0.2 to about 0.3 millimeters.

9. An alkenyl aromatic thermoplastic synthetic resinous elongate foam body, as recited in claim 7, wherein any remaining blowing agent is selected from the group consisting of ethane, chlorodifluoromethane and carbon dioxide.

10. An alkenyl aromatic thermoplastic synthetic resinous elongate foam body, as recited in claim 9, wherein the alkenyl aromatic thermoplastic synthetic resin is polystyrene.

* * * * *